US012683106B2

(12) United States Patent
Wesely et al.

(10) Patent No.: US 12,683,106 B2
(45) Date of Patent: Jul. 14, 2026

(54) ROTARY-SEGMENT ELECTROMECHANICAL SYSTEM WITH RELUCTANCE BOOST

(71) Applicant: Tyco Electronics Austria GmbH, Vienna (AT)

(72) Inventors: Bernd Wesely, Vienna (AT); Markus Gutmann, Vienna (AT)

(73) Assignee: TE Connectivity Austria GmbH, Waidhofen an der Thaya (AT)

(*) Notice: Subject to any disclaimer, the term of this patent is extended or adjusted under 35 U.S.C. 154(b) by 377 days.

(21) Appl. No.: 18/355,439

(22) Filed: Jul. 20, 2023

(65) Prior Publication Data

US 2024/0029983 A1 Jan. 25, 2024

(30) Foreign Application Priority Data

Jul. 22, 2022 (EP) .................................... 22186400

(51) Int. Cl.
*H01H 50/18* (2006.01)
*H01H 50/36* (2006.01)

(52) U.S. Cl.
CPC ............ *H01H 50/18* (2013.01); *H01H 50/36* (2013.01); *H01H 2225/006* (2013.01)

(58) Field of Classification Search
None
See application file for complete search history.

(56) References Cited

U.S. PATENT DOCUMENTS 4,329,672 A * 5/1982 Stahl ........................ H01F 7/14 335/229
6,674,349 B1 * 1/2004 Bolongeat .......... H01H 33/6662 335/229

(Continued)

FOREIGN PATENT DOCUMENTS

EP 1185995 B1 3/2002
EP 2394285 B1 12/2015

(Continued)

OTHER PUBLICATIONS

Extended European Search Report from the European Patent Office dated Jan. 26, 2023, corresponding to Application No. 22186400. 2-1201, 8 pages.

*Primary Examiner* — Bernard Rojas
(74) *Attorney, Agent, or Firm* — Barley Snyder

(57) ABSTRACT

An electromechanical system for an electrical switching device includes an energizing coil assembly having a first coil and a second coil each generating a magnetic field in response to an energizing current and a magnetic system providing a magnetic flux path passing along a plurality of magnetic flux lines of the magnetic field generated by the energizing coil assembly. The magnetic system includes a first pole member arranged on an upper side of the first coil, a second pole member arranged on an upper side of the second coil, and a rotation member arranged between the first pole member and the second pole member. The rotation member has a first lobe and a second lobe executing a rotation motion around a central axis. Magnetic field lines generated by the coils are directed toward the lobes and produce a resultant magnetic force that rotates the lobes toward the pole members.

20 Claims, 5 Drawing Sheets

(56) References Cited

U.S. PATENT DOCUMENTS

| | | | | |
|---|---|---|---|---|
| 7,626,288 | B2 * | 12/2009 | Protze | H01F 7/1607<br>335/279 |
| 11,756,759 | B2 * | 9/2023 | Mori | H01H 50/60<br>335/2 |
| 11,784,011 | B2 * | 10/2023 | Dames | H01H 50/643<br>335/136 |

FOREIGN PATENT DOCUMENTS

| | | | |
|---|---|---|---|
| EP | 3855471 | A2 | 7/2021 |
| JP | 2006005169 | A | 1/2006 |
| WO | 2006016081 | A1 | 2/2006 |
| WO | 2018234142 | A1 | 12/2018 |
| WO | 2019201735 | A1 | 10/2019 |

* cited by examiner

ROTARY-SEGMENT ELECTROMECHANICAL SYSTEM WITH RELUCTANCE BOOST

CROSS-REFERENCE TO RELATED APPLICATIONS

This application claims the benefit of the filing date under 35 U.S.C. § 119(a)-(d) of European Patent Application No. 22186400.2, filed on Jul. 22, 2022.

FIELD OF THE INVENTION

The present invention relates to electromechanical systems, and more particularly, to electromechanical systems of a rotary type.

BACKGROUND

Electro-mechanical systems are commonly used to operate contactors and relays as they present several advantages, such as the simplicity of design and operating reliability, over other types of actuating systems. Generally, common types of conventional electro-mechanical systems include a magnetic circuit having an iron core, a magnetic yoke, and an armature, and an energizing coil responsible for applying a magnetic flux onto the magnetic circuit under supply of an energizing current. The elements of the magnetic circuit are in general designed and arranged relatively to each other so that the magnetic flux generated by the energized coil is directed through the magnetic circuit to exert an attractive force onto a respective side of the armature, thereby causing the armature to move or rotate in the direction of the attractive force. Thus, it is possible to induce a switching operation of the armature between different states by controlling the sign and intensity of the external current supplied to the energizing coil.

Several types of electro-mechanical systems with different arrangements and designs of the underlying magnetic circuits and energizing coils are available in the market.

Rotary electro-mechanical systems have advantages for use in certain applications, for e.g. where an improvement in operation torque and operation stability is desired, such as provided by ball-rotation and inclined-rotation electro-mechanical systems, respectively. For instance, a rotary electromagnetic system of a ball-rotation type is described in international patent application publication WO 2018/234142A1. In this known electromagnetic system the plunging of an iron core through a classical solenoid construction is converted into a rotary motion of an armature via additional mechanical elements (balls) moving on an inclined plane (curved path). The electromagnetic system includes a magnetic yoke, a coil, a lower iron core, a top plate, an upper iron core, an armature, a magnetic isolation ring that magnetically isolates the upper iron core from the top plate and a plurality of balls. The upper iron core is able move in a vertical direction with respect to the magnetic isolation ring. A plurality of first curved grooves are formed in the bottom surface of the armature, and a plurality of second curved grooves, corresponding to the plurality of first curved grooves respectively, are formed in the top surface of the top plate. The ball may roll in the first curved groove and the corresponding second curved groove. Each first curved grooves has a depth gradually deepened from a first end to a second end, such that the force applied on the armature by the ball is inclined with respect to a central axis of the upper iron core for driving the armature to rotate around the central axis, which is parallel to the vertical direction. The linear movement of the core is thus converted into a rotational motion of the armature by the balls moving on an inclined plane which is defined by the curved path of the grooves. This implies that the transmission ratio between the vertical movement of the core and the armature rotational movement is very large, which requires having extremely precise components available. On the other hand, since the core linear movement is transformed into a rotation by using additional mechanical components, this design may present a very high gear rate and therefore, requires that extremely precise components are available. The extreme demands on the precision of the individual parts and manufacturing may not be met in practice or justifiable for every application. Furthermore, the functionality of this design is strongly dependent on the mounting direction, since the balls may lose their position, especially in a lateral assembly position. This might result in operation failures.

Thus, there is still a need for rotary electromechanical systems with designs capable of offering a direct rotational actuation of an armature so as to use a minimum of additional mechanical parts, thereby leading to designs of higher robustness than in conventional rotary electromechanical systems.

SUMMARY

An electromechanical system for an electrical switching device includes an energizing coil assembly having a first coil and a second coil each generating a magnetic field in response to an energizing current and a magnetic system providing a magnetic flux path passing along a plurality of magnetic flux lines of the magnetic field generated by the energizing coil assembly. The magnetic system includes a first pole member arranged on an upper side of the first coil, a second pole member arranged on an upper side of the second coil, and a rotation member arranged between the first pole member and the second pole member. The rotation member has a first lobe and a second lobe executing a rotation motion around a central axis. Magnetic field lines generated by the coils are directed toward the lobes and produce a resultant magnetic force that rotates the lobes toward the pole members.

BRIEF DESCRIPTION OF THE DRAWINGS

Features and advantages will become apparent from the following detailed description of the invention as illustrated in the accompanying drawings, in which.

DETAILED DESCRIPTION OF THE EMBODIMENT(S)

The present invention will now be more fully described hereinafter with reference to the accompanying drawings, in which exemplary embodiments of the invention are shown. The present invention may, however, be embodied in many different forms and should not be construed as limited to the embodiments set forth herein. Rather, these embodiments are provided so that the disclosure will convey the scope of the invention to those skilled in the art. Like numbers refer to like elements throughout.

The accompanying drawings are incorporated into and form a part of the specification for the purpose of explaining the principles of the invention. The drawings are not to be construed as limiting the invention to only the illustrated and described examples of how the invention can be made and used.

A general concept underlying the present invention lies in providing a rotary-segment electromechanical system having a magnetic system comprising a rotating member, for e.g. a rotor made of soft iron, which executes, within a special arrangement of magnetic yokes and pole plates, a rotation motion with a maximum angle of rotation which is solely limited by the pole plates. Furthermore, the electromechanical system includes an energizing coil assembly with two coil towers that carry a pair of coil windings, each wound in a respective tower by flyer winding or other suitable coil winding techniques known in the art so as to generate magnetic fields of opposed direction. The rotating member and at least one of the pole plates are designed with a special geometry, hereinafter called reluctance-boost shape contour, which is designed such that the torque generated on the rotating member when the coils are energized matches a force curve of a conventional hinged-armature magnet system, and which can especially map the high force requirements in the contact over-travel region.

Figure 1:
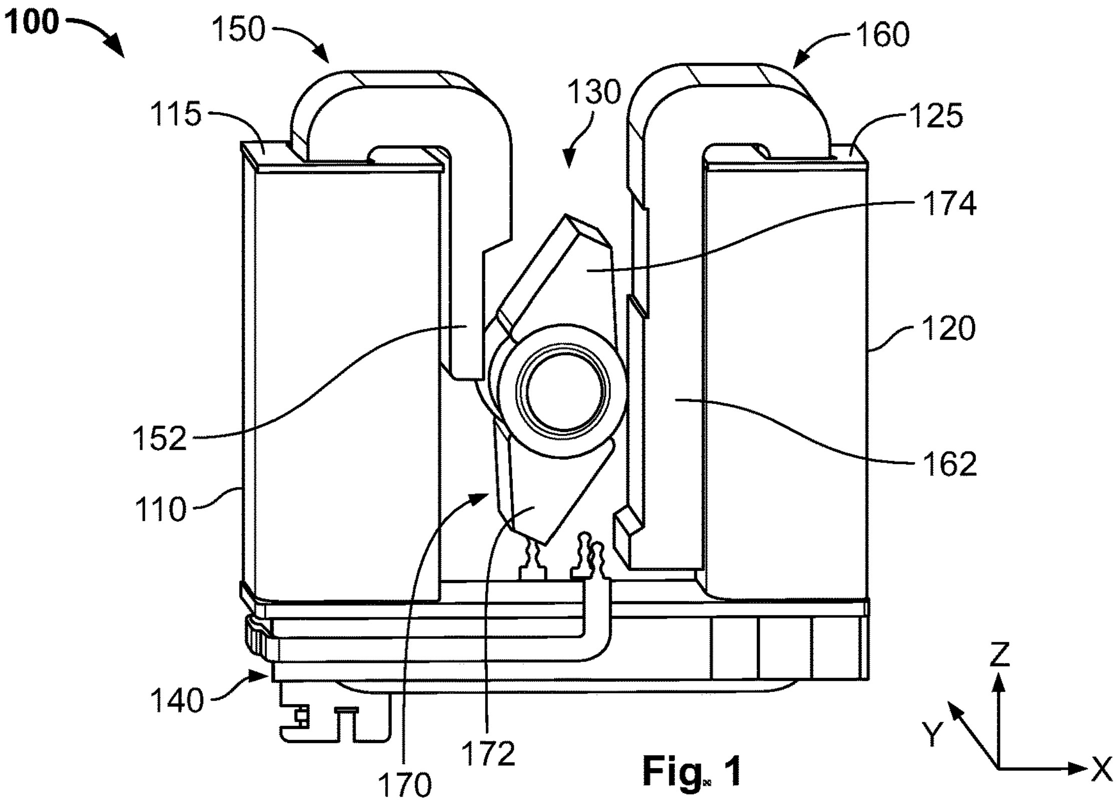
FIG. 1 is a perspective view of a rotary-segment electromechanical system according to an embodiment.

FIG. 1 is a schematic perspective view of a rotary-segment electromechanical system 100 according to an exemplary embodiment of the present invention. For ease of reference, the direction of the Z axis in the XYZ coordinate axes system shown in FIG. 1 will be referred to hereafter as the vertical direction. However, the following description of the present invention and exemplary embodiments are not to be construed as being limited to their use in a particular orientation, such as in the vertical orientation defined by gravity.

Figure 2:
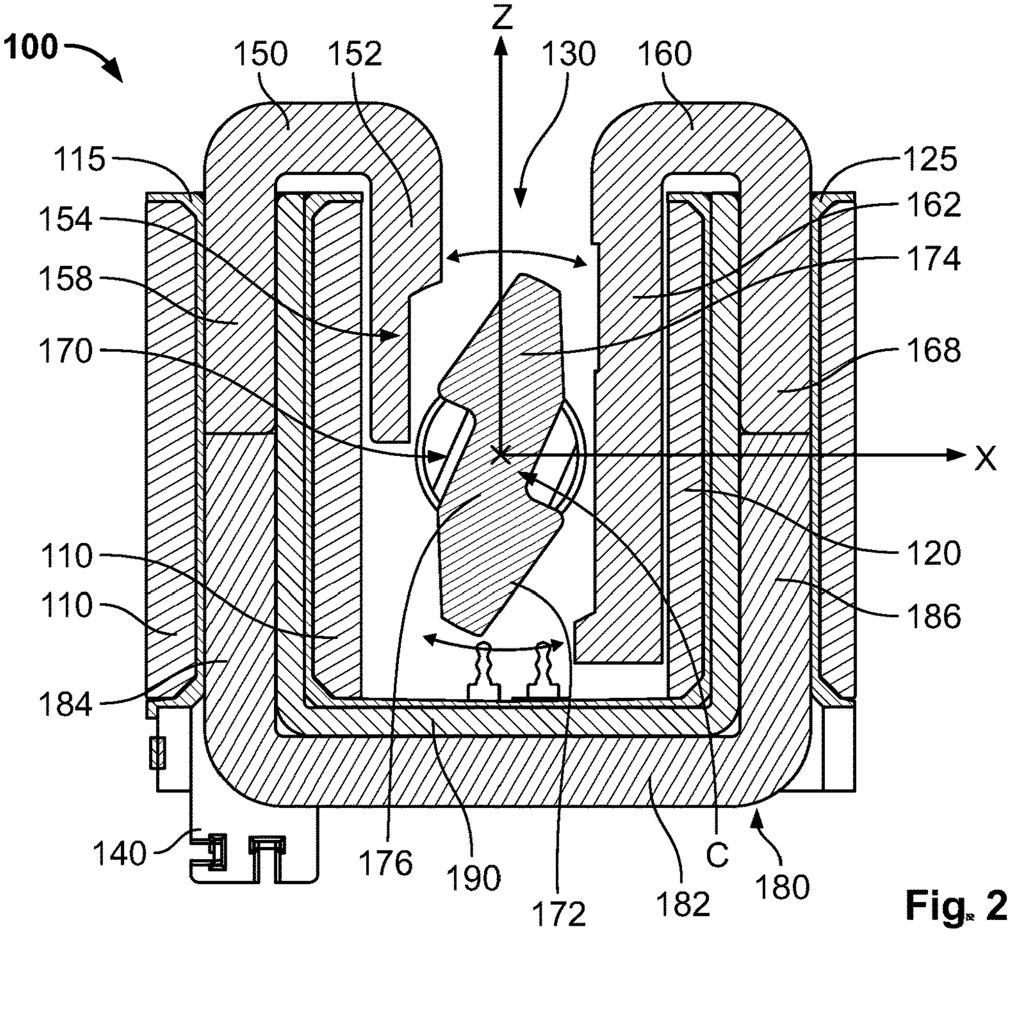
FIG. 2 is a vertical sectional view of the rotary-segment electromechanical system of FIG. 1.

The rotary-segment electromechanical system 100 comprises an energizing coil assembly for generating a magnetic field when energized with an external excitation current. Referring to FIGS. 1 and 2, the energizing coil assembly includes a first coil 110 and a second coil 120 which are aligned with the respective coil axis in parallel to each other and disposed spaced apart in a direction transverse to the coil axes by a spacing region 130. The term "coil axis" is used here when referring to a coil symmetry axis that passes across the center of the first coil 110 (or second coil 120) and is aligned along the Z-axis shown in FIG. 1.

The first coil 110 is a set of windings wound around a first coil support or tower 115 of a support body 140 of the electromechanical system 100. Similarly, the second coil 120 is a set of windings wound around a second, vertical tower 125 of the support body 140. In an embodiment, the windings of the first coil 110 are wound in the sense opposite to the windings of the second coil 120 so as to generate magnetic field lines within its inner center that are oriented in an direction opposite to the magnetic field lines generated by the second coil 120 within its inner center when both first and second coils 110, 120 are energized by a same excitation current or separate excitations currents of a same polarity. The first and second coils 110 and 120 may be connected either in series or in parallel so as to be energized by a common power supply. In an alternative configuration, the first and second coils 110 and 120 may be energized by separate energizing currents, the direction and intensity of the magnetic field generated by each coil being then determined by the respective energizing currents. The first and second coils 110 and 120 may have similar characteristics, such as number of windings, impedance, length and cross-section of the coils, which allows generating magnetic fields of similar intensity using a same energizing current.

In addition, the electromechanical system 100 includes a magnetic system that provides a preferential magnetic flux path for passing along the magnetic flux lines generated by the energizing coil assembly and which will be described in the following with reference to FIGS. 2-4.

As shown in FIG. 2, the magnetic system includes a pair of poles, hereinafter referred to as a first pole member 150 and a second pole member 160, which are respectively arranged spaced apart on an upper side of the first and second coils 110, 120. The first and second pole members 150, 160 are constructed to pass the magnetic flux lines generated by the first and second coils 110, 120, respectively, from the upper side of the coils 120, 130 into the spacing region 130, thereby providing magnetic poles of opposite polarities at their respective first end portions 152 and 162.

In addition, the magnetic system includes a rotating member 170 disposed in the spacing region 130 between the first and second coils 110, 120 and which can be rotated under a resultant magnetic attraction from the first end portions 152 and 162 of the first and second pole members 150, 160 for a given energizing current. The first end portions 152 and 162 of the pole members 150 and 160 are constructed so as to extend, on the outside of the respective first and second coils 110 and 120 on which they are arranged, in parallel to each other and to the coil axes, i.e. parallel to the vertical direction (i.e. the Z-axis direction in FIG. 2).

Figure 9:
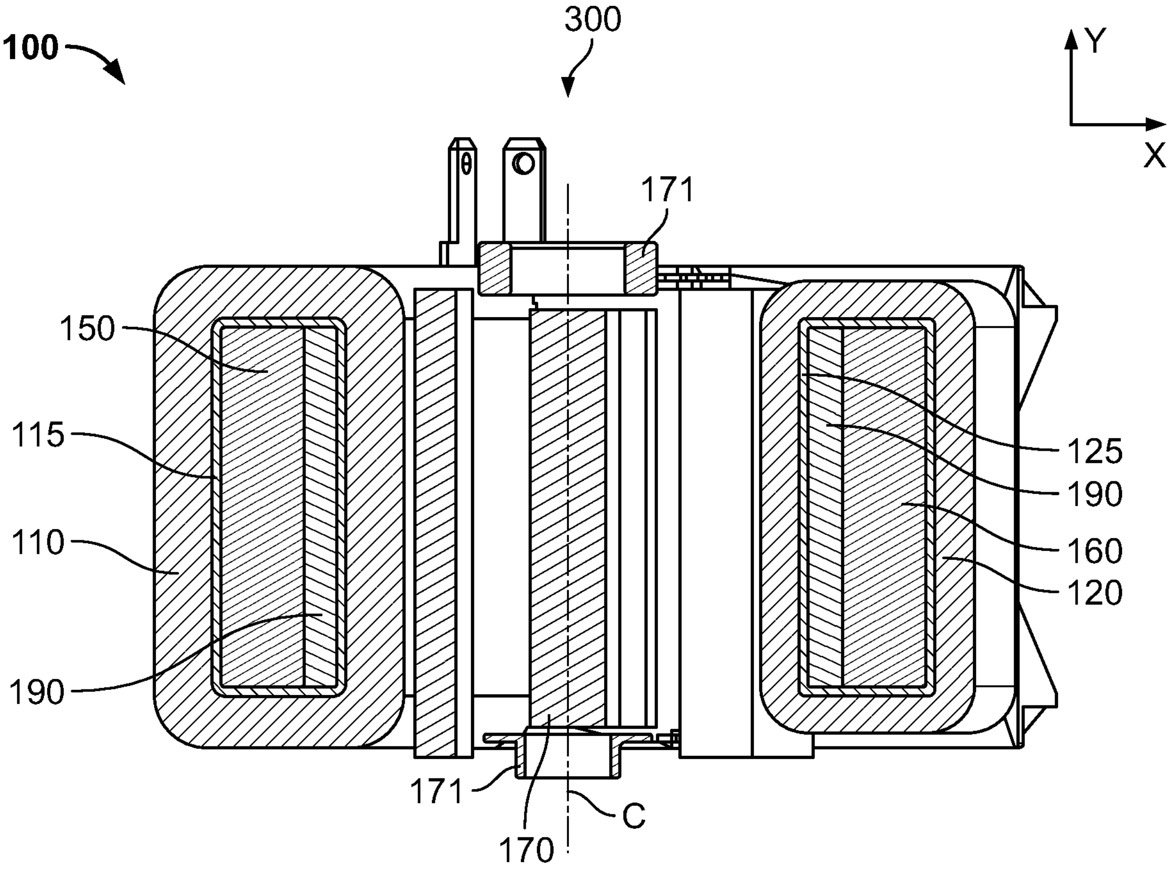
FIG. 9 is a horizontal sectional view of the electromechanical system of FIG. 1.

As shown in FIG. 2, the rotating member 170 is disposed between the first end portions 152 and 162 at an intermediate position of the spacing region 130 and mounted so as to rotate around a central axis C that substantially runs along the line of intersection between a vertical plane parallel to both the first end portions 152 and 162 and a horizontal plane transverse to the coil axes. The rotating member 170 may be supported by two suitable bearings 171 (such as plain bearings, ball bearings, and the like), shown in FIG. 9, for facilitating the rotation motion. The rotating member 170 is also designed with a cross-sectional shape (taken in a vertical plane transverse to the central axis C) which includes a central region 176 (centered on the central axis C) and a pair of lobes 172 and 174 disposed diametrically opposed to each other with respect to the central region 176 and having respective end faces oriented to face the first end portions 152 and 162 of the first and second pole members 150 and 160, respectively. As shown in FIGS. 2-3, the first and second lobes 172 and 174 may have mirrored contour shapes.

In addition, since the first pole member 150 is intended to interact mainly with the first lobe 174 of the rotating member 170, which is on an upper part of the rotating member 170 (i.e. the part above the horizontal plane containing the central axis C) in the open state, the first end portion 152 is made to extend from the upper side of the first coil 110 downwards into the spacing region 130 and along at least a portion of the longitudinal length of the first coil 110 such as to be disposed between the first coil 110 and one side of the rotating member 170 (which is a left side in FIG. 2) and substantially cover the length of the first lobe 174, for e.g. by reaching the horizontal plane containing the central axis C.

The second pole member 160 is designed for mainly interacting with the lower lobe 172 of the rotating member 170, which is below the horizontal plane containing the central axis C in the open state. Accordingly, the first end portion 162 of the second pole member 160 extends into the spacing region 130, along an outside of the second coil 120, as shown in FIG. 2, and is disposed on the right side of the rotating member 170. Furthermore, in order to fully overlap with the length of the lower lobe 172, the first end portion 162 of the second pole member 160 extends over a longer distance than the first end portion 152 of the first pole member 15, for e.g. until the end of the lower lobe 172 in the open state.

The open state corresponds to a rotation state of the rotating member 170 at which the first and second lobes 172, 174 are not in mechanical contact with the first and second pole members 110 and 120. Moreover, each of the lobes 172, 174 is separated from the respective first end portions 152 and 162 of the first and second pole members 110 and 120 by the maximum separation gap which can be achieved during the whole rotation motion of the rotating member 170. For instance, as shown in FIG. 2, the lobes 172 and 174 are disposed in diametrically opposed sides with respect to a horizontal plane XY containing the central axis C. Thus, the open state corresponds to a state of rotation where exists a maximum reluctance (magnetic resistance) between the rotating member 170 and each of the first pole 110 and the second pole 120.

Figure 3:
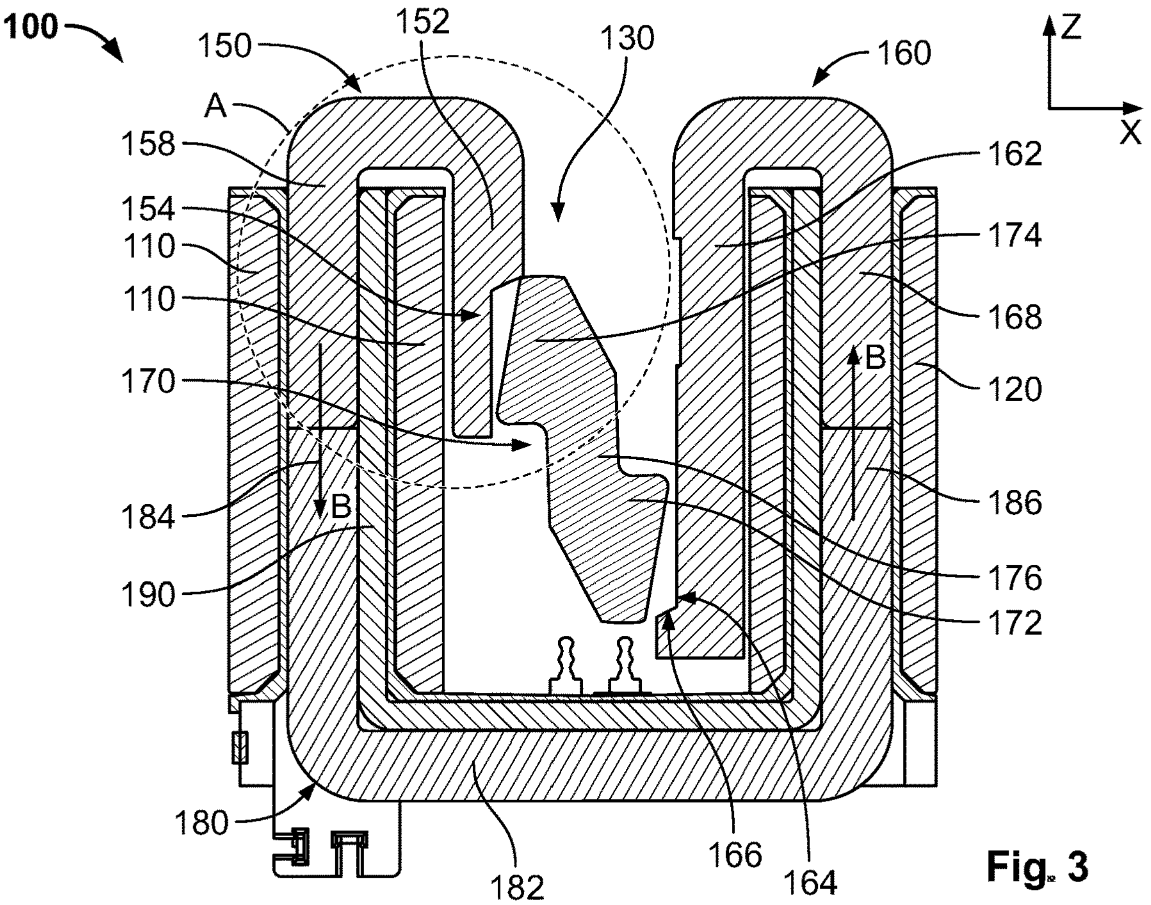
FIG. 3 is a vertical sectional view of the electromechanical system in a state of contact between a rotating member and a facing pole member of the electromechanical system.

When the first and second coils 110 and 120 are energized by an energizing current of a given sign and sufficient intensity, the magnetic flux lines of the magnetic field B generated by the first and second coils 110 and 120 are directed towards the first and second lobes 172, 174 of the rotating member 170 by the first end portions 152 and 162 with opposed senses, such as shown in FIG. 3. The resultant of magnetic forces applied by the first end portions 152 and 162 onto the first and second lobes 172, 174 of the rotating member 170 causes the rotating member 170 to rotate around the central axis C towards one of the pole members 150 and 160, (in the counter-clock direction in the example of FIG. 3), until reaching a rotation state at which the left lobe 174 comes into mechanical contact with the first end portion 152 of the attracting pole member 150.

The shapes of the pole members 150 and 160, the rotating member 170 and the distance between them are selected such as to reduce the magnetic resistance (reluctance) along a part of the magnet flux path that is formed by the pole members 150, 160, the rotating member 170 and the separation gap between them, and therefore enhance the resultant attractive magnetic force onto one or both of the first and second lobes 172, 174 at the beginning of contact, as will be described in the following.

In order to improve the effect of the torque produced onto the rotating member 170 by the generated magnetic field, at least one of the pole members 150 and 160 and the respective facing lobe 174 or 172 are designed to enhance the magnetic attraction between them upon energizing the coil assembly.

In the present embodiment, the first end portions 152 and 162 of the first and second pole members 150 and 160 and the respective lobes 174, 172 of the rotating member 170 are designed with matching reluctance-boost shape contours specifically designed to reduce reluctance when the respective lobe enters into contact with the first end portion 152, 162 during the rotation motion.

Figure 4:
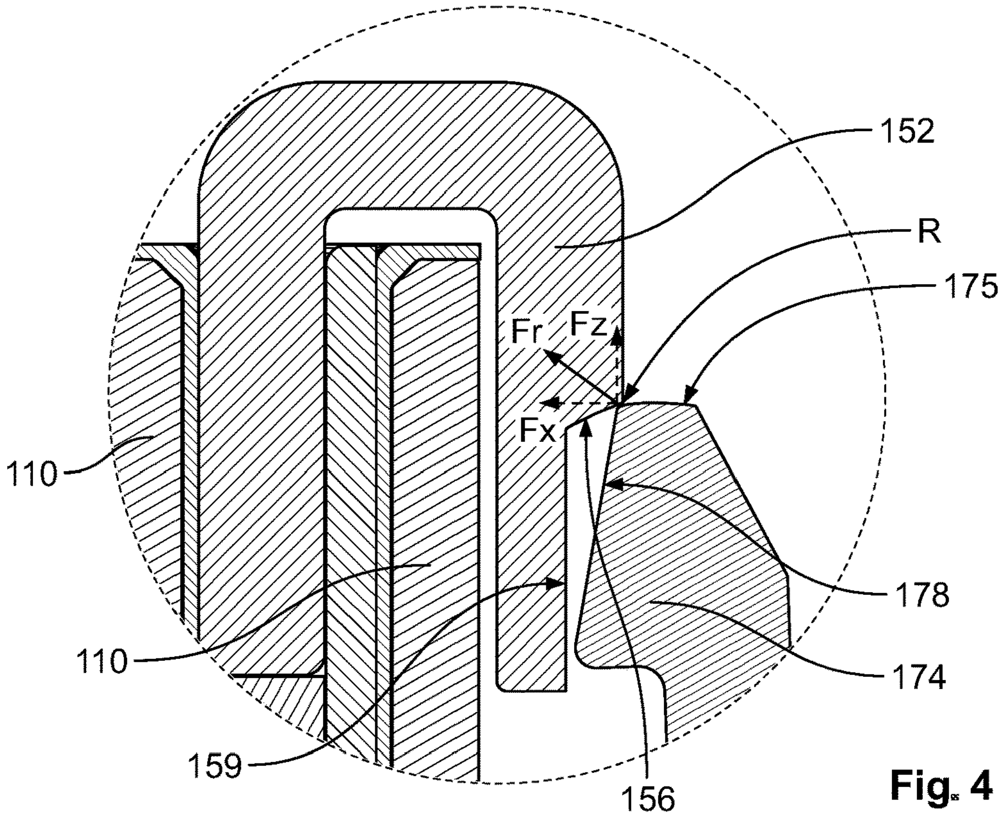
FIG. 4 is a detailed view of inset A of FIG. 3 and shows the specific reluctance-boost shape of the rotating member and facing pole member as well as a schematic diagram of the force components of the resultant reluctance force applied on the rotating member.

For instance, referring to FIG. 4, the first end portion 152 is provided with a recess 154 with the step shape and having a curved side wall 156 which is defined by a circular segment of a given length and radius on a plane transverse to the central axis C. In addition, the matching reluctance-boost shape contour of the facing lobe 174 has a complementary curved side wall 175 at the lobe end face such that the overlapping contact between the first lobe 174 and the first end portion 152 of the pole member 150 is gradually increased during rotation until the rotation motion is stopped at the predetermined maximum angle of rotation. The step recess 154 is dimensioned so as to establish a punctual mechanical contact with the lobe 174 upon rotation of the rotating member 170 towards the first end portion 152 and before reaching a final state of full mechanical contact between the first end portion 152 and the lobe 174. In particular, the length of the circular segment is set based on the desired maximum angle of rotation by which the rotating member 170 may rotate from the open state until a closed state at which the rotation motion is stopped. The radius of the circular segment is defined by the size from the rotating member 170.

This specific reluctance-boost shape contour allows enhancing the resultant attractive magnetic force exerted onto the lobe 174 at the beginning of contact by reducing the reluctance (magnetic resistance) between the first end portion 152 and the lobe 174. The enhancement of the effective force is determined by the direction of the resultant reluctance force Fr. As shown in the inset of FIG. 4 for the first pole member 150, the strongest effect of the magnetic force between the first end portion 152 and the facing lobe 174 of the rotating member 170 is achieved when the lobe 174 first enters into contact with the curved side wall 156 of the step recess 154. At this stage, the horizontal component Fx of the resultant force Fr is responsible for the rotation movement in the counter-clockwise direction. This horizontal component Fx is greatest at the moment when the curved edge 175 of the rotating member lobe 174 and the curved segment 156 of the step recess 154 in the first pole member 150 begin to overlap. Upon continued rotation in the counter-clockwise direction, the horizontal component Fx decreases with the increase of overlapping surface between the recess curved segment 156 and the lobe curved edge 175, until reaching a state when the magnitude of the Fr only has a vertical force component Fy (Y-component) and the rotation movement is stopped by the base 159 of the step recess. By selecting the appropriate begin of the overlapping position between the rotating member 170 and the first end portion 152 of the pole member 150, relative to the end position of the rotating member 170, the point R of maximum reluctance can be selected to occur at certain angle positions.

Thus, since the reluctance force Fr is based on the change of the magnetic resistance (reluctance) and always acts in the direction of the lowest magnetic resistance, the specific features of the reluctance-boost shape contour result in a force component (reluctance force Fr) being added, which causes a punctual increase in the total attractive force. As a result, the lobes 172, 174 of the rotating member 170 describe a rotation movement in respective circular segments centered in the central axis C.

The rotation motion is automatically stopped when the predetermined maximum angle of rotation is reached and at which there is full overlapping contact between the matching reluctance-boost shape contours of the facing lobe 174 and the first end portion 152, i.e. full overlap contact between the curved side-walls 156 and 166 as well as from an end face 178 of the lobe 174 against the base 159. Thus, the length and radius of the circular segments 156, 166 of the reluctance-boost shape contours may be selected so as to limit the rotation motion executed by the rotating member 170 to a desired maximum angle of rotation, depending on the desired application for the electromechanical system 100. For instance, the curved segments 156 and 166 may be designed to achieve a predetermined maximum angle of rotation equal to or less than 45°.

In the present embodiment, the matching reluctance-boost shape contour is also provided in the first end portion 162 of the second pole member 160 and the second lobe 172 of the rotating member 170. Specifically, the first end portion 162 is also provided with a step recess 164 with a curved side wall 166, shown in FIG. 3, that defines a circular segment on a plane transverse to the central axis C. In addition, the matching reluctance-boost shape contour of the facing lobe 172 has a complementary curved side wall at the lobe end face such that the overlapping contact between the second lobe 172 and the first end portion 162 of the pole member 160 is gradually increased during rotation until the rotation motion is stopped at the predetermined maximum angle of rotation. Similarly to the first pole member 150, the step recess 164 is also dimensioned with respect to the facing lobe 172 of the rotating member 170 so as to establish a punctual mechanical contact therewith upon rotation of the rotating member 170 towards the first end portion 162. The curved side walls 156 and 166 are similar, i.e. having the same curvature radius and length. On the other hand, in order to meet tolerances of state-of-art manufacturing processes, the end position of the rotating member 170 in the closed state is determined by a full mechanical contact of the rotating member 170 with only one of the pole members 150 or 160. In the example of FIG. 3, the lobe 174 will be in full contact with the step recess 154 of the first end portion 152, whereas an air gap remains between the first end portion 162 of the second pole member 160 and the lobe 172 of the rotating member 170, even when the system 100 is closed.

Accordingly, when the coil assembly is energized by a suitable energizing current (in intensity and polarity), the rotating member 170 rotates by the predetermined rotation angle to a closed state at which the first lobe 174 of the rotating member 170 fully abuts against the facing first end portion 152 of the first pole member 150. The reset of the electromechanical system 100, i.e. the return of the rotating member 170 to the open state upon the coil assembly being de-energized, may be performed via coil springs integrated in the magnetic system and which make the rotating member 170 return to the initial state when no magnetic force is being applied onto the rotating member 170. The open state also generally coincides with an initial rotation state in which the first and second coils 110 and 120 are not supplied with an energizing current and therefore, the pole members 150 and 160 are not magnetized.

In order to facilitate assembly as well as improve mechanical stability of the first and second pole members 150, 160 arranged on the first and second coils 110, 120, particularly when the electromechanical system 100 is to be mounted in a lateral orientation (for e.g. with the first and second pole members 150, 160 arranged in a horizontal orientation), the first and second pole members 150, 160 may be provided with respective second end portions 158, 168 that penetrate from the upper side of the respective first and second coils 110, 120 into an inner space of the respective first and second coils 150, 160 along the coil axes and extending over a portion of the total length of the coils 110, 120. In particular, the first and second pole members 150, 160 may be each constructed with a U-shape form and arranged such that the U-shape legs corresponding to the second end portions 158 and 168 penetrate downwards through the inner spacing of the respective coils 110, 120. The other leg of the pole member 150 (or 160) comprises the first end portion 152 (or 162) and is arranged to extend outside the first coil 110 (or the second coil 120).

The magnetic flux path between the first and second pole members 150, 160 is closed from a lower side of the first and second coils 110, 120 by a main core 180, shown in FIG. 3. In the shown embodiment, the main core 180 is arranged on a lower side of the first and second coils 110, 120 and partially penetrates into the inner spacing of the first and second coils 110, 120 to connect the second end portion 158 of the first pole member 150 to the second end portion of the second pole member. The main core 180, the first pole member 150, the rotating member 170 and the second pole member 160 thus define the main magnetic flux path provided by the magnetic system of the electromechanical system 100.

The main core 180 may be constructed with a U-shape formed by a central region 182 and a pair of first and second legs 184, 186 that extend upwards from respective sides of said central region 182. The first leg 184 of the main core 180 penetrates through the inner space of the first coil 110, from the lower side of the first coil 110, while the second leg 186 penetrates through the inner space of the second coil 120. Both legs 184, 186 of the main core 180 are provided with sufficient length so as to extend upwards through the respective coils 110, 120 until contacting with the second end portions 158, 168 arranged inside the first and the second pole members 150, 160, respectively. Thus, the main core 180 defines the magnetic flux path on the lower side of the coil assembly and half-way across the first and second coils 110, 120. Of course, the length of the main core legs 184, 186 may be shorter or longer than illustrated in FIG. 2 since it depends on the length of the second portions 158, 168 of the first and second poles 110, 120.

In order to increase the confinement of magnetic flux lines inside the inner space of the first and second coils 110, 120, the magnetic system of the electromechanical system 100 may also comprise an auxiliary core 190. For instance, the auxiliary core 190 may be arranged adjacent to the main core 180 and with a part that penetrates partially through the first coil 110 and the second coil 120 inner spacing. For instance, as shown in FIG. 2, the auxiliary core 190 may be also provided with a U-shape form with legs that extend along the full axial length of the first coil 110 and the second coil 120, thereby also covering the second end portions 158, 168 of the first and second pole members 150, 160. The main core 180 and/or the auxiliary core 190 may be provide as a single piece core or composed of core fragments. In an embodiment, the main core 180 and/or the auxiliary core 190 are made of soft iron, in solid or laminated form. The rotating member 170 may also be made of soft iron.

Figure 5:
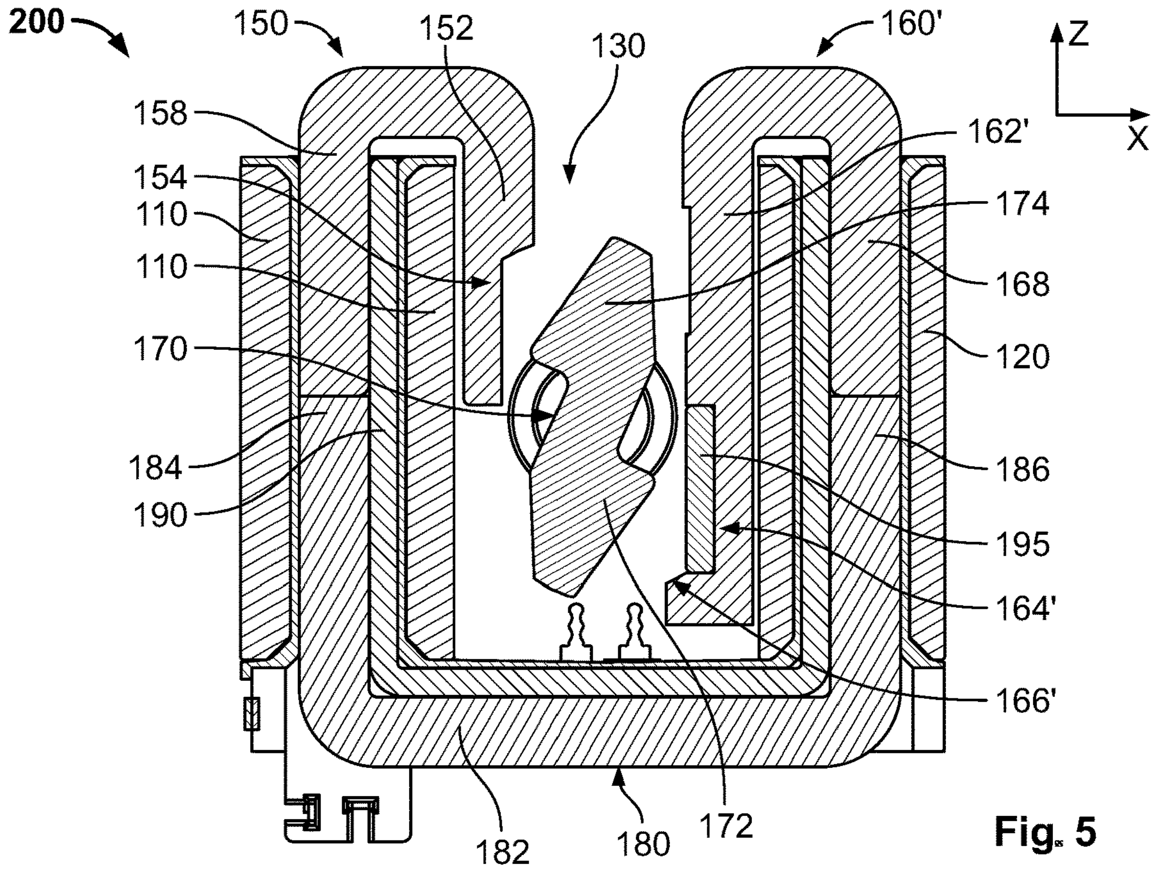
FIG. 5 is a vertical sectional view of a rotary-segment electromechanical system according to another embodiment, in an open state.

In an embodiment, an auxiliary permanent magnet 195, shown in FIG. 5, can be added at one of the two first end portions 152 and 162 of the pole members 150 and 160 for increasing the magnetic force exerted onto the corresponding lobes 174 and 172 of the rotating member 170, and therefore the resultant torque applied onto the rotating member 170. The permanent magnet 195 is then arranged facing the respective lobe of the rotating member 170 and magnetically polarized to reduce reluctance across the separation gap between the respective first end portion and the facing lobe.

FIG. 5 is a vertical sectional view of a rotary-segment electromechanical system 200 according to a further exemplary embodiment of the present invention which combines the reluctance-boost geometry in both poles with the auxiliary permanent magnet 195 provided in one of the pole members. Specifically, the electromechanical system 200 mainly differs from the electromechanical system 100 described with reference to FIGS. 1-4 in that the magnetic system includes a second pole member 160' with a second end portion 162' on which a permanent magnet 195 is arranged. In this configuration, the second end portion 162' also includes a step recess 164'. As shown in FIG. 5, the step recess 164' includes a curved segment 166' similar to the curved segment 166 of the reluctance-boost recess of the previous embodiment of FIGS. 1-4, which protrudes away from a front face of the permanent magnet 195 which is arranged in an additional cavity provided in the second end portion 162. The permanent magnet 195 is magnetically polarized with respect to the lower lobe 172 of the rotating member and the direction of the magnetic flux lines across the second coil 120 so as to enhance the attractive magnetic force applied onto the lower lobe 172, and therefore, increase the torque of the rotation member 170 in the counter-clockwise direction. Apart from the modified step recess 164', the other features of the second pole member 160' are similar or identical to those described above with reference to the second pole member 160.

The other features of the electromechanical system 200 shown in FIG. 5 are also identical or similar to those of the electromechanical system 100 described above. Namely, the electromechanical system 200 maintains the first pole member 150 with the step recess 154 having the specific reluctance-boost contour described in the previous embodiment. Therefore, a full description of the identical elements will be omitted for the present embodiment.

In an alternative configuration, the addition of the auxiliary permanent magnet 195 may be implemented by discarding the reluctance-boost geometry on one of the pole members on which the permanent magnet is installed, as in the exemplary embodiment described below with reference to FIGS. 7-8.

Figure 6:
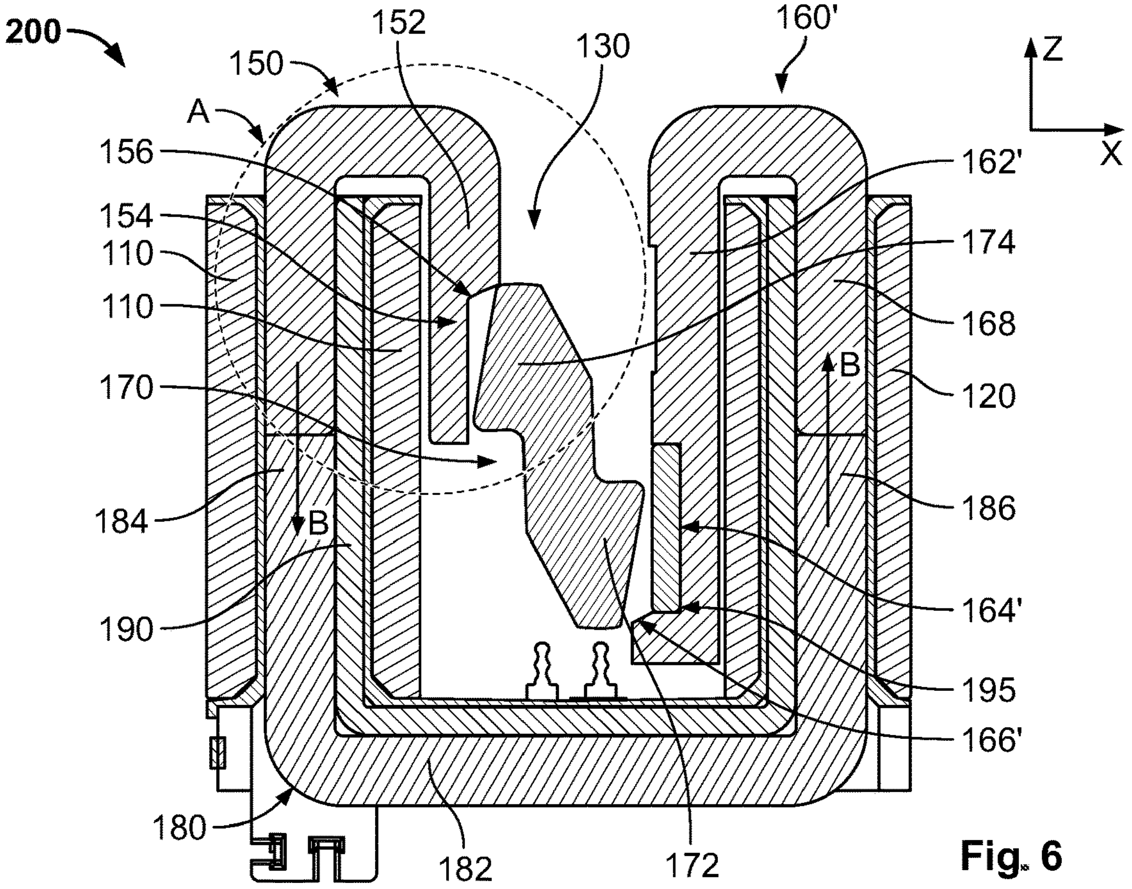
FIG. 6 is a vertical sectional view of the electromechanical system of FIG. 5, in a state of contact between a rotating member and a facing pole member of the electromechanical system.
Figure 7:
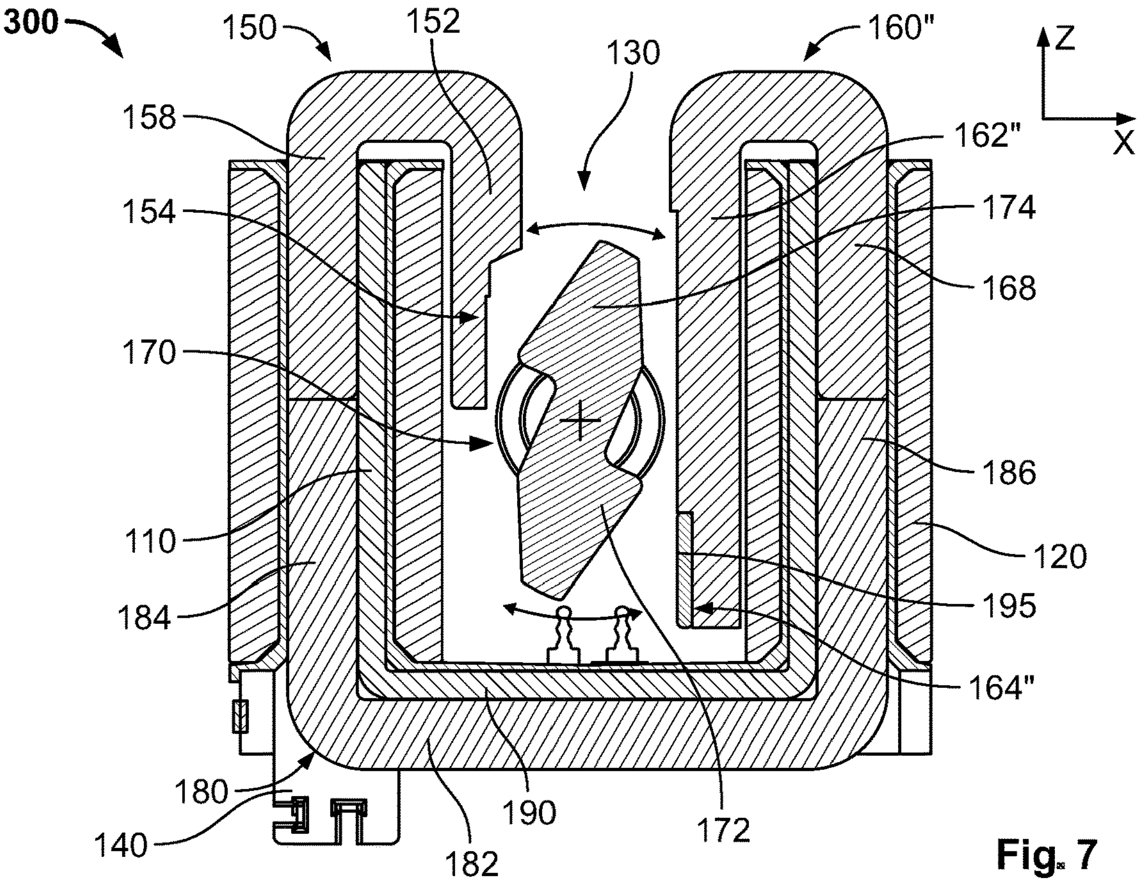
FIG. 7 is a vertical sectional view of an electromechanical system according to another embodiment, in an open state.
Figure 8:
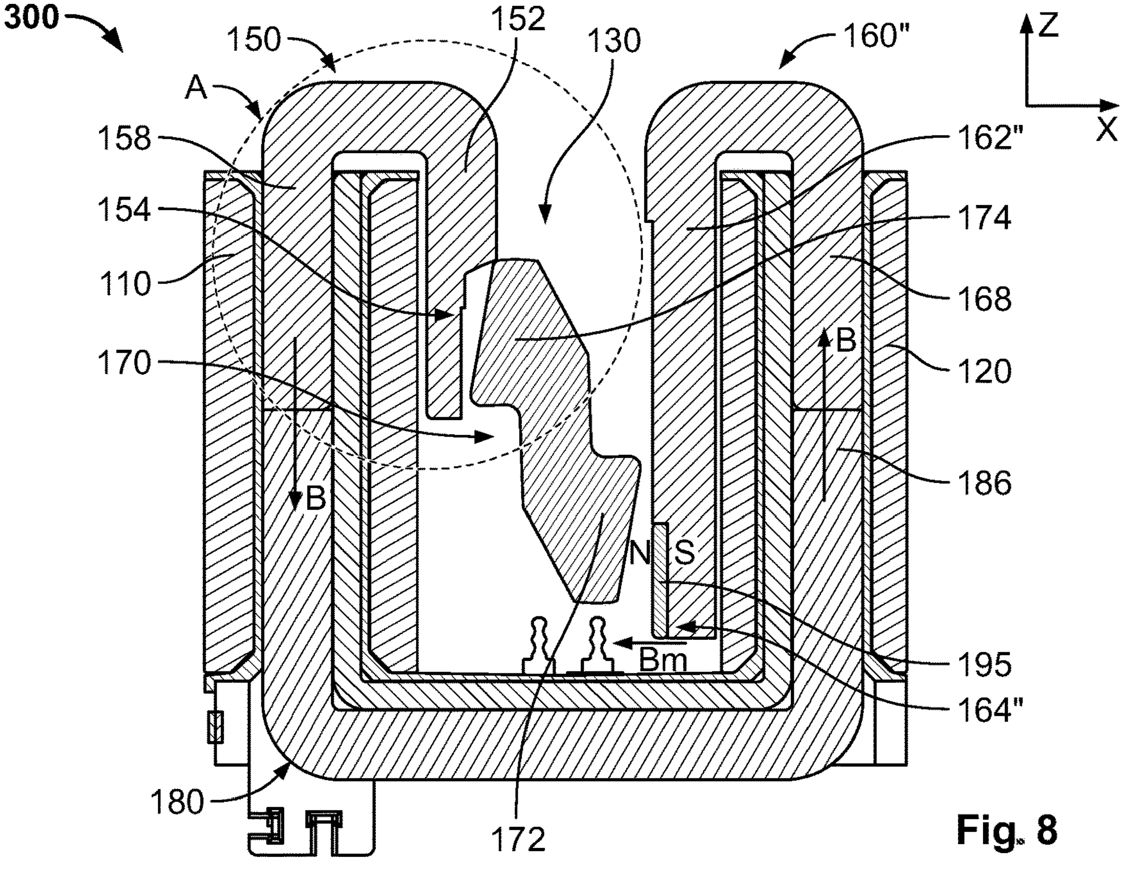
FIG. 8 is a vertical sectional view of the electromechanical system of FIG. 7, in a state of contact between a rotating member and a facing pole member of the electromechanical system.

As shown in FIG. 7, the permanent magnet 195 may be provided in the first end portion 162 of the second pole member 160 (instead of the second pole member 160' shown in FIG. 5) by modifying the step recess 154 to accommodate the permanent magnet 195 while maintaining the curved segment 156 responsible for achieving the reluctance-boost effect. Specifically, the electromechanical system 300 mainly differs from the electromechanical system 100 described with reference to FIGS. 1-4 in that the magnetic system includes a second pole member 160" with a second end portion 162" on which the permanent magnet 195 is arranged. In this configuration, the second end portion 162" is simply provided with a cavity or standard step recess 164" in which the permanent magnet 195 is arranged, i.e. without a curved side wall protruding away from a front face of the permanent magnet 195 such as in the electromechanical system 200 described with reference to FIGS. 5 and 6. The permanent magnet 195 is also oriented with a magnetically polarity that enhances the attractive magnetic force applied onto the lower lobe 172, and therefore, increase the torque of the rotation member 170 in the counter-clockwise direction. Apart from the modification of the second end portion 162" for accommodating the permanent magnet 195, the other features of the second pole member 160" are similar or identical to those described above with reference to the second pole member 160. The other features of the electromechanical system 300 shown in FIGS. 7-8 and which are identified by the same reference numerals are also identical or similar to those of the electromechanical system 100 described above. Therefore, a full description of the identical elements of the electromechanical system 300 will be omitted in the present embodiment.

In conclusion, the rotary-segment electromechanical systems according to the principles of the present invention described above may be used for operating contact systems of electrical switching devices, such as DC power relay, with a direct rotating motion that is limited by a rotation angle of a predetermined angle, for example up to 45°, while using a minimum of moving parts, thereby offering a design of higher robustness than conventional rotary electromechanical systems. The electromechanical system offers a torque performance suitable for contact systems of electromechanical relays.

Although certain features of the above exemplary embodiments were described using terms such as “top”, “bottom”, and “upper”, these terms are used for the purpose of facilitating the description of the respective features and their relative orientation within the optical module only and should not be construed as limiting the claimed invention or any of its components to a particular spatial orientation. Moreover, although the present invention has been described above with reference to mid-board optical modules, the principles of the present invention can also be applied to other types of optical modules that involve thermal, optical and electrical interfacing so as to achieve dense packaging of such devices.

Although certain features of the above exemplary embodiments were described with reference to the Figures using relative terms such as “vertical direction”, “left”, “right”, “upward” and “downward”, these terms are to be understood as being defined with reference to the coordinate system XYZ depicted in the respective figures. Unless otherwise specified in the description, the terms “vertical” or “upper side” are used in the above description for describing a feature that is positioned in the positive direction of the coordinate axis Z with respect to other features of the electromechanical system, and the term “right side” is to be construed at the side in the positive direction of the coordinate axis X. Nonetheless, it should be understood that these terms are used only for the purpose of facilitating the description of the respective features and how they are positioned/oriented with respect to each other and should not be construed as limiting the claimed invention or any of its components to an installation or use in a particular spatial orientation.

What is claimed is:

1. An electromechanical system for an electrical switching device, comprising:

an energizing coil assembly including a first coil and a second coil each generating a magnetic field in response to an energizing current; and a magnetic system providing a magnetic flux path passing along a plurality of magnetic flux lines of the magnetic field generated by the energizing coil assembly, the magnetic system including:

a first pole member arranged on an upper side of the first coil;

a second pole member arranged on an upper side of the second coil, the first pole member and the second pole member each have a first end portion arranged outside the first coil and the second coil, the first end portions are parallel to each other and to a first coil axis of the first coil;

a rotation member arranged between the first pole member and the second pole member, the rotation member having a first lobe and a second lobe executing a rotation motion around a central axis aligned along an intersection of a plane parallel to the first end portions with a plane transverse to the first coil axis, the first end portions direct a plurality of magnetic field lines generated by the first coil and the second coil toward the first lobe and the second lobe, respectively, and produce a resultant magnetic force that causes the first lobe and the second lobe to execute the rotation motion toward the first pole member and the second pole member, respectively, upon energizing the energizing coil assembly; and a main core arranged on a lower side of the first coil and the second coil, the main core connects the first pole member to the second pole member, the main core, the first pole member, the rotation member, and the second pole member form the magnetic flux path.

2. The electromechanical system according to claim 1, wherein the first coil and the second are coil are spaced apart by a given spacing distance.

3. The electromechanical system according to claim 1, wherein at least one of the first end portions and one of the first lobe and the second lobe facing the at least one first end portion have a plurality of reluctance-boost shape contours that are matching and reduce reluctance when the one of the first lobe and the second lobe enters into contact with the at least one first end portion during the rotation motion.

4. The electromechanical system according to claim 3, wherein one of the reluctance-boost shape contours of the at least one first end portion has a shape of a step recess with a curved side wall defined by a circular segment of a given length on a plane transverse to the central axis.

5. The electromechanical system according to claim 4, wherein one of the reluctance-boost shape contours of the one of the first lobe and the second lobe facing the at least one first end portion has a complementary curved side wall such that an overlapping contact between the one of the first lobe and the second lobe and the at least one first end portion is gradually increased until the rotation motion is stopped at a predetermined angle of rotation.

6. The electromechanical system according to claim 5, wherein the rotation motion is stopped at a predetermined maximum angle of rotation at which there is a full overlapping contact between the matching reluctance-boost shape contours of the one of the first lobe and the second lobe facing the at least one first end portion.

7. The electromechanical system according to claim 5, wherein a length and a radius of the circular segment of the one of the reluctance-boost shape contours limits the rotation motion executed by the rotation member to a maximum angle of rotation equal to or less than 45°.

8. The electromechanical system of claim 1, wherein the magnetic system includes a permanent magnet on at least one of the first end portions of the first pole member and the second pole member, the permanent magnet faces one of the first lobe and the second lobe of the rotation member and is magnetically polarized to reduce reluctance across a separation gap between the first end portion on which it is arranged and the one of the first lobe and the second lobe.

9. The electromechanical system of claim 3, wherein the reluctance-boost shape contours are provided in only one of the first portions of the first pole member and the second pole member, a permanent magnet is provided on the other one of the first portions of the first pole member and the second pole member.

10. The electromechanical system of claim 1, wherein the rotation member has an open state which is a rotation orientation at which the first lobe and the second lobe are respectively separated from the first end portions of the first pole member and the second pole member by a pair of maximum separation gaps when the energizing coil assembly is not energized.

11. The electromechanical system of claim 1, wherein the rotation member rotates by a predetermined rotation angle to a closed state when the energizing coil assembly is energized by a given energizing current, in the closed state one of the first lobe and the second lobe fully abuts against one of the first end portions of the first pole member and the second pole member.

12. The electromechanical system of claim 5, wherein the predetermined angle of rotation is equal to or less than 45°.

13. The electromechanical system of claim 1, wherein the first pole member and the second pole member each have a second end portion penetrating from the upper side of each of the first coil and the second coil into an inner space of each of the first coil and the second coil.

14. The electromechanical system of claim 1, wherein at least one of the first pole member and the second pole member has a U-shape form with a pair of legs extending downward with respect to the upper side of the first coil and the second coil, the legs have the first end portions extending outside the first coil and the second coil.

15. The electromechanical system of claim 1, wherein the main core has a U-shape formed by a central region and a pair of first legs and second legs that extend upwards from respective sides of the central region, the first legs penetrate an inner space of the first coil and the second legs penetrate an inner space of the second coil, from the lower side of the first coil and the second coil, extending upwards until contacting with a plurality of second end portions of the first pole member and the second pole member.

16. The electromechanical system of claim 1, wherein the magnetic system includes an auxiliary core increasing a confinement of magnetic flux lines inside an inner space of the first coil and the second coil, the auxiliary core extends along an axial length of the first coil and the second coil and along an inner side of the main core.

17. The electromechanical system of claim 16, wherein:

the main core and/or the auxiliary core may be made as a single piece or a plurality of pieces magnetically coupled to each other;

the main core and/or the auxiliary core are made of a soft iron; and/or the rotation member is made of the soft iron.

18. An electrical switching device, comprising:

the electromechanical system of claim 1.

19. The electrical switching device of claim 18, wherein the electrical switching device is a contactor or a relay.

20. An electromechanical system for an electrical switching device, comprising:

an energizing coil assembly including a first coil and a second coil each generating a magnetic field in response to an energizing current; and a magnetic system providing a magnetic flux path passing along a plurality of magnetic flux lines of the magnetic field generated by the energizing coil assembly, the magnetic system including:

a first pole member arranged on an upper side of the first coil;

a second pole member arranged on an upper side of the second coil, the first pole member and the second pole member each have a first end portion arranged outside the first coil and the second coil, the first end portions are parallel to each other and to a first coil axis of the first coil; and a rotation member arranged between the first pole member and the second pole member, the rotation member having a first lobe and a second lobe executing a rotation motion around a central axis aligned along an intersection of a plane parallel to the first end portions with a plane transverse to the first coil axis, the first end portions direct a plurality of magnetic field lines generated by the first coil and the second coil toward the first lobe and the second lobe, respectively, and produce a resultant magnetic force that causes the first lobe and the second lobe to execute the rotation motion toward the first pole member and the second pole member, respectively, upon energizing the energizing coil assembly, at least one of the first end portions and one of the first lobe and the second lobe facing the at least one first end portion have a plurality of reluctance-boost shape contours that are matching and reduce reluctance when the one of the first lobe and the second lobe enters into contact with the at least one first end portion during the rotation motion, one of the reluctance-boost shape contours of the at least one first end portion has a shape of a step recess with a curved side wall defined by a circular segment of a given length on a plane transverse to the central axis.

* * * * *